Patented Nov. 12, 1940

2,221,552

UNITED STATES PATENT OFFICE 2,221,552

CHLORINATED STARCH AND PROCESS FOR PRODUCTION OF SAME

John Nicolson, Paisley, Scotland, assignor to Corn Products Refining Company, New York, N. Y., a corporation of New Jersey No Drawing. Application January 26, 1939, Serial No. 252,889

10 Claims.  (Cl. 127—33)

This invention relates to the production of chlorinated starch, and has for its primary object first to provide a novel process for the production of chlorinated starch which will require less time and be simpler and more economical than the processes now used; and second, to produce a chlorinated starch having new and improved properties; specifically, a chlorinated starch which, when pasted, will give a dried film harder and more impenetrable to liquids, ink for example, than the films of ordinary chlorinated starch.

The process is applicable to all starches, for example corn (maize), potato, and tapioca starches.

The usual method of chlorinating starch is to mix with starch in the form of a starch milk or water suspension of starch, having a density of about 20° Baumé, a sodium hypochlorite solution containing about 7%–8% available chlorine, and continuously agitate the mixture for from 15 to 20 hours. The soluble solids resulting from the reaction are removed from the chlorinated starch by repeated washing with cold water, whereupon the startch is dewatered to a moisture content of about 40% and then dried.

According to the process of the present invention the hypochlorite solution is sprayed into starch in a dry state contained in a mixer having agitating means (for example in a Day mixer having a helical revolving agitator) the starch becoming moist although still remaining in a solid state. The spraying and agitation is continued until the chlorinating reaction is completed, whereupon the material may be dried to any desired moisture content, for example to a moisture content of 15% to 20%.

By "dry starch" is intended starch in a powdered or pearl state containing, for example, the amount of moisture in air dry starch.

The chlorinating reaction generates heat and a mixer is therefore employed having a water jacket through which cooling water is circulated to keep the starch below its gelatinizing temperature, having regard to the amount of moisture present. The maximum temperature is reached at about the middle of the period of treatment after which the temperature falls somewhat.

This process has several advantages over the usual process of chlorinating the starch in water suspension: There is a saving of about 1% in chlorine consumption; the converting time is about 30 minutes instead of 15 to 20 hours; the washing and filtering or dehydrating operations are eliminated; and the amount of moisture which has to be evaporated in the drying operation is reduced about 10%.

The product of the present invention has certain improved characteristics over the ordinary chlorinated starches. For example, a film made by pasting starch chlorinated in accordance with the present invention is harder and more ink-resistant than a film made from starch chlorinated by the methods heretofore used. Chlorinated starches are employed for coating paper for lithographic printing. The product of the present invention is particularly useful in this connection because of the increased hardness and increased resistance to ink penetration of a film made therefrom. It also gives a coating which is less likely to peel off from the paper.

The following is a specific example of the application of the invention to practice. It will be understood, however, that this example is illustrative and informative only. The invention is not to be regarded as limited to the particulars therein given, the intention being to claim all equivalents and also all modifications within the scope of the appended claims.

*Example.*—9,080 grams of corn (maize) starch (about 20 pounds) is put into a Day mixer provided with a water jacket. Into the starch is sprayed, little by little, 2500 cubic centimeters (about 0.56 gallons) of a solution of sodium hypochlorite containing 8% available chlorine and 2% sodium hydroxide. The mixture is agitated continuously during the spraying operation, which takes about 30 minutes time. Heat is generated by the oxidizing action of the sodium hypochlorite on the starch. To prevent the temperature from rising too high, to a point which would gelatinize the starch, cold water is circulated through the jacket of the mixer to hold the mixture to a maximum temperature of 45° C. (113° F.). This temperature is ordinarily reached at the end of the first 15 minutes of mixing. At the end of the next 15 minutes the temperature has fallen to about 30° C. (86° F.). At the end of the mixing and converting operation the moisture content of the starch is about 32%. The converted product is then dried in any suitable drier to a moisture content of about 15%–20%.

The chlorine concentration in the sodium hypochlorite may range between 5% and 10% available chlorine by volume of the solution. Below about 5% there would be too much moisture introduced into the starch for practical operation under the principles of the invention. Above about 10% available chlorine the sodium hypochlorite solution is inclined to be unstable, with a tendency for the free chlorine to be liberated and produce an ill smelling product.

The amount of caustic soda in the solution should range between 1½% and 3%. Below 1½% the sodium hypochlorite solution is too unstable. Caustic soda is ordinarily added to the sodium hypochlorite in order to stabilize the solution. Above 3% the converting action of the caustic soda is ordinarily too great, giving too highly converted products.

The amount of the sodium hypochlorite solution may vary between 2% and 6% of available chlorine based upon the weight of the starch.

The time required for the reaction may be somewhat greater or less than 30 minutes, according to converting conditions.

The maximum temperature during the converting operation should be between 40° and 50° C. (104° and 122° F.). Above this range there would be risk of gelatinizing the starch.

The moisture content of the starch at the end of the converting period and before drying may be between 30% and 50%. Above 50% the starch begins to form a milk.

I claim:

1. Process for the production of chlorinated starch which comprises introducing, little by little, into dry starch and dispersing it therein with substantial uniformity sodium hypochlorite solution in an amount to give between 2% and 6% of available chlorine based on the weight of the starch; and agitating the mixture to effect the chlorination of the starch while cooling it to keep its temperature below the gelatinizing temperature of the starch.

2. Process for the production of chlorinated starch which comprises introducing, little by little, into dry starch and dispersing it therein with substantial uniformity sodium hypochlorite solution in an amount to give between 2% and 6% of available chlorine based on the weight of the starch; and agitating the mixture to effect the chlorination of the starch while cooling the same to give it a maximum temperature between 40° and 50° C. (104°-122° F.).

3. Process for the production of chlorinated starch which comprises introducing, little by little, into dry starch and dispersing it therein with substantial uniformity, sodium hypochlorite solution in an amount to give between 2% and 6% of available chlorine based on the weight of the starch; and agitating the mixture for about 30 minutes, or more, to effect the chlorination of the starch, while cooling the material to prevent rise of temperature above the gelatinizing temperature of the starch.

4. Process for the production of chlorinated starch which comprises introducing, little by little, into dry starch and dispersing it therein with substantial uniformity, sodium hypochlorite solution in an amount to give between 2% and 6% of available chlorine based on the weight of the starch and whereby the starch will have an ultimate moisture content between 30% and 50%; and agitating the mixture to effect the chlorination of the starch.

5. Process for the production of chlorinated starch which comprises introducing, little by little, into dry starch and dispersing it therein with substantial uniformity, sodium hypochlorite solution in an amount to give between 2% and 6% of available chlorine based on the weight of the starch and whereby the starch will have an ultimate moisture content between 30% and 50%; agitating the mixture to effect the chlorination of the starch while cooling the same to prevent rise of temperature above the gelatinizing temperature of the starch; and drying the starch to a moisture content of approximately 15%–20%.

6. Process for the production of chlorinated starch which comprises introducing, little by little, into dry starch and dispersing it therein with substantial uniformity, a sodium hypochlorite solution having a concentration of between 5% and 10% available chlorine in an amount to give between 2% and 6% of available chlorine, based on the weight of the starch; and agitating the mixture to effect the chlorination of the starch.

7. Process for the production of chlorinated starch which comprises introducing, little by little, into dry starch and dispersing it therein with substantial uniformity, a sodium hypochlorite solution containing between 1½% and 3% of caustic soda in an amount to give between 2% and 6% of available chlorine, based upon the weight of the starch; and agitating the mixture to effect the chlorination of the starch.

8. Process for the production of chlorinated starch which comprises introducing, little by little, into dry starch and dispersing it therein with substantial uniformity, a solution of sodium hypochlorite, having a concentration between 5% and 10% available chlorine and containing between 1½% and 3% of caustic soda, in an amount to give between 2% and 6% of available chlorine, based on the weight of the starch; and effecting an intimate mixture of the starch and hypochlorite to bring about the chlorination of the starch.

9. Process for the production of chlorinated starch which comprises introducing, little by little, into dry starch and dispersing it therein with substantial uniformity, a sodium hypochlorite solution, having a concentration of between 5% and 10% available chlorine and containing between 1½% and 3% caustic soda, in an amount to give between 2% and 6% of available chlorine, based upon the weight of the starch to give the starch an ultimate moisture content between 30% and 50%; and effecting an intimate mixture of the starch and hypochlorite to bring about the chlorination of the starch while cooling the mixture to hold the same to a maximum temperature between 40° and 50° C. (104°–122 F.).

10. Process for the production of chlorinated starch which comprises spraying into 20 pounds of starch about 0.56 gallons of sodium hypochlorite solution containing 8% available chlorine and 2% sodium hydroxide to give the starch an ultimate moisture content of about 32%; agitating the material for about 30 minutes or more; cooling the mixture to hold it to a maximum temperature of about 45 C. (113° F.); and drying the product to a moisture content of about 15%–20%.

JOHN NICOLSON.